United States Patent
Ito et al.

[11] Patent Number: 5,315,813
[45] Date of Patent: May 31, 1994

[54] METHOD AND APPARATUS FOR MANUFACTURING OPTICAL FIBER CABLE

[75] Inventors: Yasushi Ito; Nobumasa Nirasawa, both of Kanagawa, Japan

[73] Assignee: Sumitomo Electric Industries, Ltd., Osaka, Japan

[21] Appl. No.: 907,647

[22] Filed: Jul. 2, 1992

[30] Foreign Application Priority Data

Jul. 5, 1991 [JP] Japan .................. 3-164915

[51] Int. Cl.$^5$ .............................. D02G 3/36
[52] U.S. Cl. .............................. 57/6; 57/13; 57/294
[58] Field of Search ......... 57/204, 210, 229, 9, 57/6, 13, 293, 294

[56] References Cited

U.S. PATENT DOCUMENTS

| | | | |
|---|---|---|---|
| 4,156,624 | 5/1979 | de Vecchis et al. | 57/13 X |
| 4,619,107 | 10/1986 | Missout et al. | 57/13 X |
| 4,781,433 | 1/1988 | Arroyo et al. | |
| 4,796,414 | 1/1989 | Bruggmann et al. | 57/13 X |
| 4,825,629 | 5/1989 | Missout et al. | 57/13 X |
| 5,092,117 | 3/1992 | Päivinen et al. | 57/293 |

FOREIGN PATENT DOCUMENTS 1576339 10/1980 United Kingdom .

OTHER PUBLICATIONS

Patent Abstracts of Japan, abstract of JP61284712, vol. 011147 pub. May 14, 1987.

Primary Examiner—Joseph J. Hail, III
Attorney, Agent, or Firm—Cushman, Darby & Cushman

[57] ABSTRACT

An apparatus for, and method of manufacturing an optical fiber cable whereby stable transmission characteristics, such as length and tension, are maintained throughout a specified length of the cable. A slotted rod having spiral grooves formed longitudinally on the surface thereof is hauled by a hauling device, optical fibers or optical fiber ribbons are inserted into the spiral grooves, and a binding is applied onto the outer surface of the slotted rod to form the basis for an optical fiber cable stranding. The optical cable stranding with the optical fibers or the like inserted in the spiral grooves and with the binding applied thereon is wound around a guide wheel, thereby maintaining stable transmission characteristics throughout a specified length of the cable, and then further hauled. The guide wheel is rotatable about a rotary axis perpendicular to the hauling direction of the slotted rod.

5 Claims, 3 Drawing Sheets

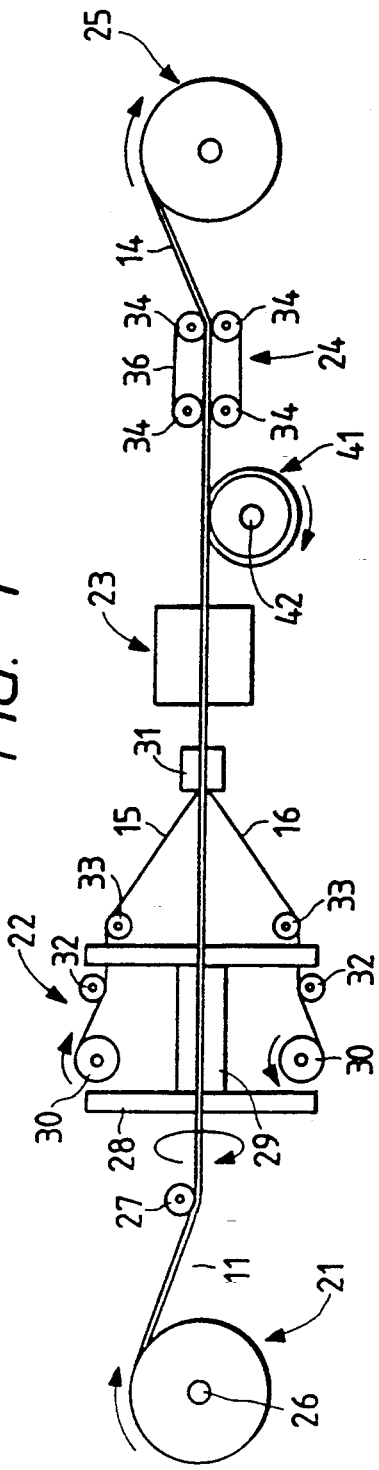
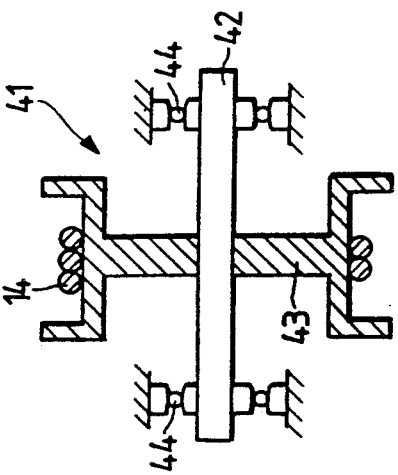
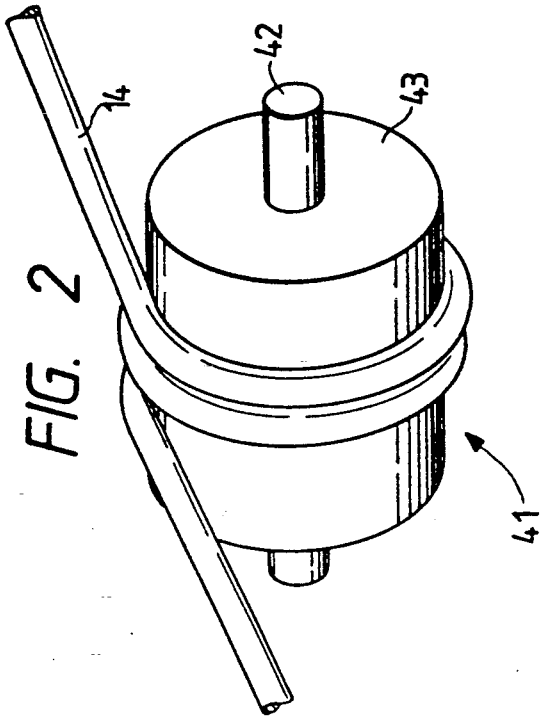

METHOD AND APPARATUS FOR MANUFACTURING OPTICAL FIBER CABLE

BACKGROUND OF THE INVENTION

The present invention relates to an optical fiber cable manufacturing method and apparatus in which optical fibers are inserted into the spiral grooves on a slotted rod, and then a binding is applied on the outer surface of the slotted rod to thereby form an optical fiber cable.

Generally, in the case where optical fibers or electric wires are used as an optical cable or a communication copper cable, the optical fibers or wires are inserted into the spiral grooves of a slotted rod so as to form an optical fiber cable, thereby increasing the strength of the optical fiber cable.

FIG. 6 (PRIOR ART) shows an optical fiber cable stranding known in the prior art. A slotted rod 11 has a tension wire 12 at its center. Four square-shaped spiral grooves 13 are formed in the outer circumferential surface of rod 11. Spiral grooves 13 extend spirally in a longitudinal direction. An optical fiber 15, or an optical fiber ribbon 16 comprising a plurality of optical fibers 15 bundled together, is inserted into each of the grooves 13. A binding is then applied to the outer circumference of rod 11 to thereby form optical fiber cable stranding 14.

FIG. 7 (PRIOR ART) shows a conventional apparatus for manufacturing an optical fiber cable stranding, such as, for example, shown in FIG. 6 (PRIOR ART). A supply drum 21 having a rotary shaft 26 feeds out the slotted rod 11.

The slotted rod 11 is wound on the supply drum 21. The supply drum 21 is rotatably supported by a rotary shaft 26 so that the slotted rod 11 can be hauled through a guide roller 27 in the direction perpendicular to the rotary shaft 26.

An optical fiber insertion device 22 is arranged to insert the optical fibers 15 or optical fiber ribbons 16 into the respective spiral grooves 13 (see FIG. 6) of the slotted rod 11. A rotary disc 28 is rotatably supported by a rotary shaft 29 provided along the hauling direction of the slotted rod 11. A plurality of supply reels 30 carrying the optical fibers 15 or the optical fiber ribbons 16 wound thereon are mounted on the rotary disc 28. A groove insertion device 31 for inserting the optical fibers 15 or the optical fiber ribbons 16 into the spiral grooves 13 of the slotted rod 11 is provided adjacent to the rotary disc 28. Guide rolls 32 and 33 are attached behind the rotary disc 28 to haul the optical fibers 15 or the optical fiber ribbons 16 into the groove insertion device 31. The rotary disc 28 can be rotated by a driving means (not shown) about the axis in the hauling direction of the slotted rod 11 in synchronism with the spiral grooves 13 of the slotted rod 11.

The string winding device 23 applies a binding onto the outer surface of the slotted rod 11 which has the optical fibers 15 or the optical fiber ribbons 16 inserted therein at the time of passage through the string winding device 23. Further, the hauling device 24 hauls the thus formed optical fiber cable 14 so as to give desired tension thereon. In the hauling device 24, belts 36 are driven through four rollers 34. Further, the winding drum 25 winds up the optical fiber cable 14. The hauling device may also be such a double-wheel hauling device 35 as shown in FIG. 8.

Thus, as shown in FIG. 7 (PRIOR ART), when the hauling device 24 is operated so as to haul the optical fiber cable 14, the supply drum 21 is rotated about the rotary shaft 26, and while the rotary disc 28 is being rotated by the driving means, the supply reels 30 are rotated. Then, the slotted rod 11, the optical fibers 15, and the optical fiber ribbons 16 are hauled, so that the optical fibers 15 or the optical fiber ribbons 16 are inserted by the groove insertion device 31 into the spiral groove 13 in the slotted rod 11. A binding is applied by the string winding device 23 onto the slotted rod 11 to thereby form the optical fiber cable 14. Then, the optical fiber cable 14 is wound on the winding device 25.

In the conventional optical fiber cable manufacturing method described above, the optical fibers 15 or the optical fiber ribbons 16 which are inserted into the spiral grooves 13 of the slotted rod 11 have low tension and are subject to movement within the grooves 13. The position of the optical fibers 15 or the optical fiber ribbons 16 relative to the slotted rod 11, therefore, is not fixed, even after passing through the hauling device 24, until the optical fiber cable 14 is wound on the winding drum 25. Accordingly, it is difficult to make the relative lengths between the slotted rod 11 and the optical fibers 15 or the optical fiber ribbons 16 accurate and even over the entire length of the optical fiber cable 14, or in a required range thereof. Therefore, using the conventional method and apparatus of manufacturing an optical fiber cable, stable transmission characteristics of the optical fiber cable 14 cannot be maintained.

Further, as shown in FIG. 8, even if the hauling device 24 is of a double-wheel winding type 35, the tension in the optical fiber cable 14 is generally reduced either before or after passage through the hauling device 24. Thus, it cannot be specified at what position of the double wheel type hauling device 35 the tension of the optical fiber cable 14 is reduced. Even the slack, frictional force, or the like of the optical fiber cable 14 cannot be specified when utilizing a double wheel type hauling device 35.

When utilizing the conventional method and apparatus for manufacturing an optical fiber cable, the optical fiber cable 14 is in a constant state of flux during the manufacture process. Therefore, the position where the optical fibers 15 or the optical fiber ribbons 16 are fixed relative to the slotted rod 11 cannot be specified due to the friction factor or the fine change of the tension of the optical fibers 15, and is always changing in the manufacture of the optical fiber cable. That is, at the time when the relative length between the slotted rod 11 and the optical fibers 15 or the optical fiber ribbons 16 is fixed, the tension of the optical fiber cable 14, that is, the slotted rod 11 cannot be specified.

Accordingly, as described above, in the conventional optical fiber cable 14, the relative length between the slotted rod 11 and the optical fibers 15 or the optical fiber ribbons 16 cannot be made even over the entire length of the optical fiber cable or in a required range thereof, so that stable transmission characteristics of the optical fiber cable 14 cannot be maintained.

SUMMARY OF THE INVENTION

The present invention solves the aforementioned problem, and an object thereof is to provide an optical fiber cable manufacturing method in which stable transmission characteristics of an optical fiber cable are obtained as well as maintained.

In order to attain the above object, the present invention provides an apparatus and a method of manufacturing an optical fiber cable in which a slotted rod is hauled by a hauling device, optical fibers are inserted into spiral grooves formed longitudinally in the outer surface of said hauled slotted rod, and a binding is applied onto the outer surface of said slotted rod. The slotted rod carrying the optical fibers inserted in the spiral grooves and being provided with the binding applied thereon is subsequently wound on a guide wheel which is rotatable about an axis perpendicular to the hauling direction of the slotted rod, and then the slotted rod is hauled by the hauling device.

The manufactured optical fiber cable is wound once on the rotatable guide wheel and then hauled, so that the tension of the optical fiber cable is not reduced. The relative length between the slotted rod and the optical fibers, or optical fiber ribbons, is fixed in the state in which the tension of the slotted rod is consistent and apparent, and the length of the optical fibers relative to the slotted rod is subsequently made even over the entire length of the cable or in a required length thereof.

BRIEF DESCRIPTION OF THE DRAWINGS

FIG. 1 a front schematic view of an optical fiber cable manufacturing apparatus for carrying out the optical fiber cable manufacturing method which is an embodiment of the present invention.

FIG. 2 is a perspective view of a guide wheel 41.

FIG. 3 is a sectional view of the guide wheel 41.

DETAILED DESCRIPTION OF THE PREFERRED EMBODIMENT

Figure 4:
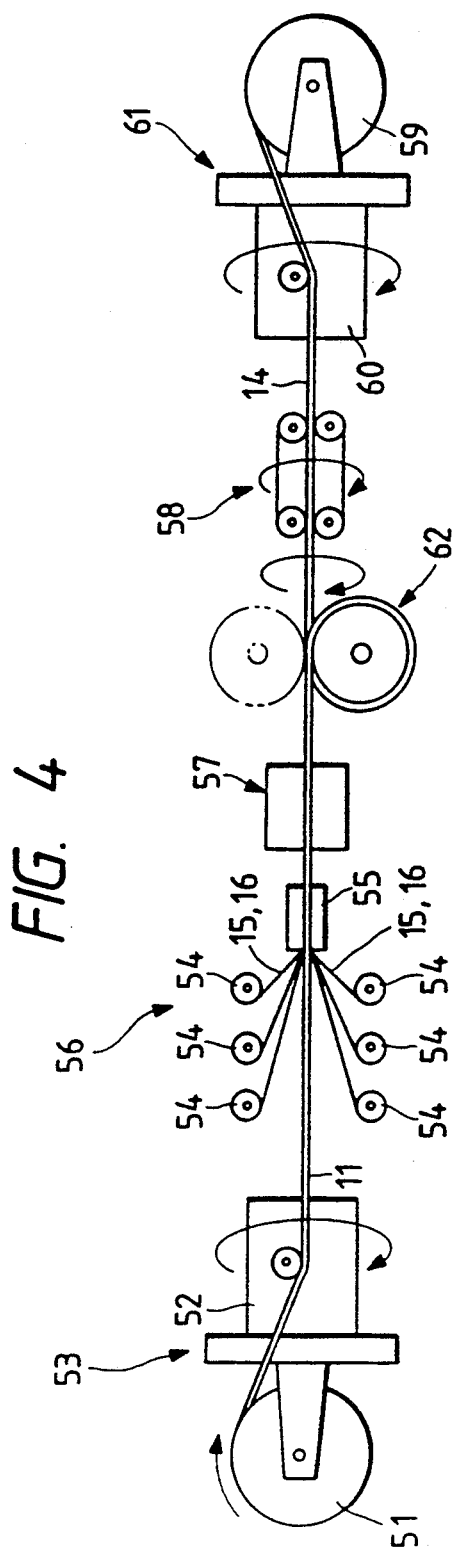
FIG. 4 is a front schematic view of the optical fiber cable manufacturing apparatus for carrying out the optical fiber cable manufacturing method which is another embodiment of the present invention.

Referring to the drawings, embodiments of the present invention will be described in detail hereunder.

FIG. 1 shows an optical fiber cable manufacturing apparatus of the present invention for carrying out the optical fiber cable manufacturing method according to the present invention. FIGS. 2 and 3 show a perspective and sectional view, respectively, of the guide wheel used in the present invention. The members of the present manufacturing apparatus having the same functions as those of the conventional members are correspondingly referenced.

As shown in FIG. 1, the optical fiber cable manufacturing apparatus for the embodiment is constituted by a supply drum 21, for feeding out slotted rod 11, on an outer circumference of which a slotted rod 11 is wound; an optical fibers insertion device 22 for inserting a plurality of optical fibers 15 or optical fiber ribbons 16 into spiral grooves 13 in the slotted rod 11; a string winding device (or a tape winding device) 23 for applying a binding onto an outer surface of the slotted rod 11 carrying the optical fibers 15 or the optical fiber ribbons 16 inserted therein; an optical fiber cable 14 hauling device 24 for hauling the optical fiber cable 14 so as to give a desired tension thereto; and a winding drum 25 for winding up the optical fiber cable 14. A guide wheel 41 which can rotate the optical fiber cable 14 in the axial direction perpendicular to the hauling direction of the slotted rod 11 is provided between the string winding device 23 and the hauling device 24.

As shown in FIGS. 2 and 3, in the guide wheel 41, a wheel body 43 is integrally fixed about a rotary shaft 42 so that the optical fiber cable 14 can be wound at least twice around the outer circumferential surface of the wheel body 43. The rotary shaft 42 can be freely rotated by bearings 44.

Thus, as shown in FIG. 1, when the hauling device 24 hauls the optical fiber cable 14, the supply drum 21 rotates to feed the slotted rod 11 while maintaining a predetermined tension throughout the slotted rod 11. On the other hand, while a rotary disc 28 is rotating and respective supply reels 30 are rotating the optical fibers 15 and the optical fiber ribbons 16 are hauled from their respective supply reels 30 at a low tension. The hauled optical fibers 15 and optical fiber ribbons 16 are inserted into the spiral grooves 13 of slotted rod 11 by a groove insertion device 31 while maintaining the relative position between the slotted rod 11 and the spiral grooves 13. A binding is then applied to the slotted rod 11 by the string winding device 23 so that the optical fibers 15 or the optical fiber ribbons do not come off from the spiral grooves 13.

Optical fiber cable 14, supplied with the binding, emerges from the string winding device 23 and is wound on the guide wheel 41, sent through the hauling device 24, and wound up on the winding drum 25. The optical fiber cable 14 is wound at least twice around the guide wheel 41 so that the relative lengths of the slotted rod 11, the optical fibers 15 and the optical fiber ribbons 16 are fixed over the whole length of the cable while the tension applied by the supply drum 21 is maintained throughout the optical fiber cable 14. Therefore, the optical fiber cable 14 is made to be in a stable state. The optical fiber cable 14 is wound on the winding drum 25 with the tension lower than the hauling force; therefore, the transmission characteristics of the optical fiber cable are discernable and can be measured in the steps.

Figure 5:
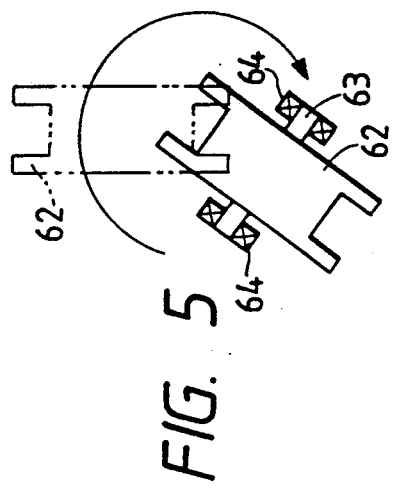
FIG. 5 is a sectional view for explaining the operation of a guide wheel according to the second embodiment of the present invention.
Figure 8:
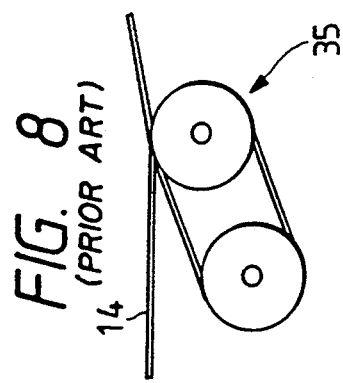
FIG. 8 (PRIOR ART) is a schematic view showing another hauling device.
Figure 6:
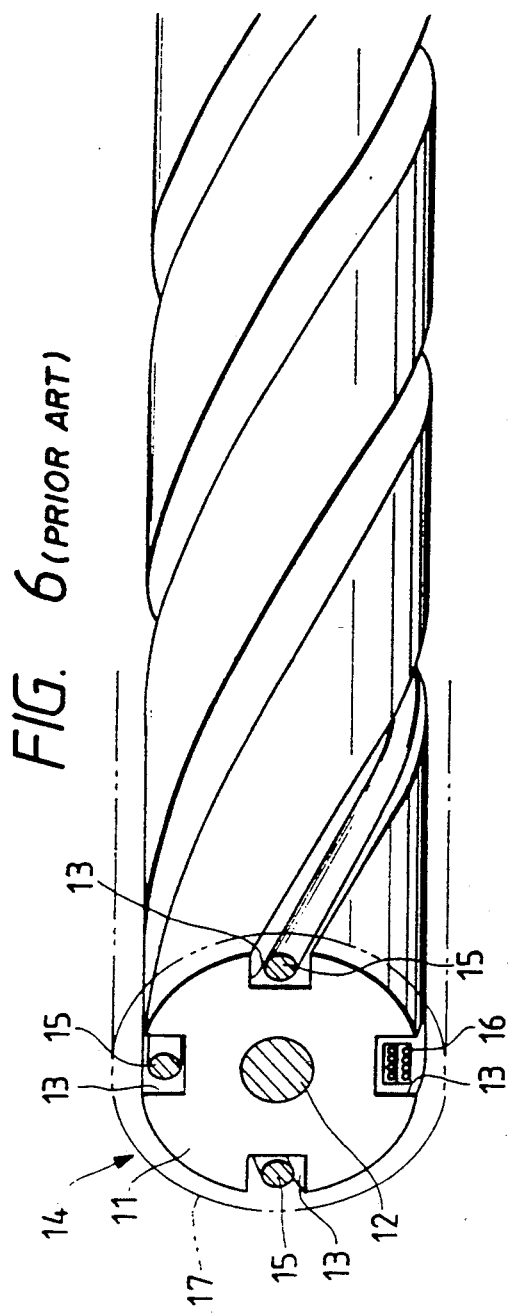
FIG. 6 (PRIOR ART) is a perspective view of an optical fiber cable.
Figure 7:
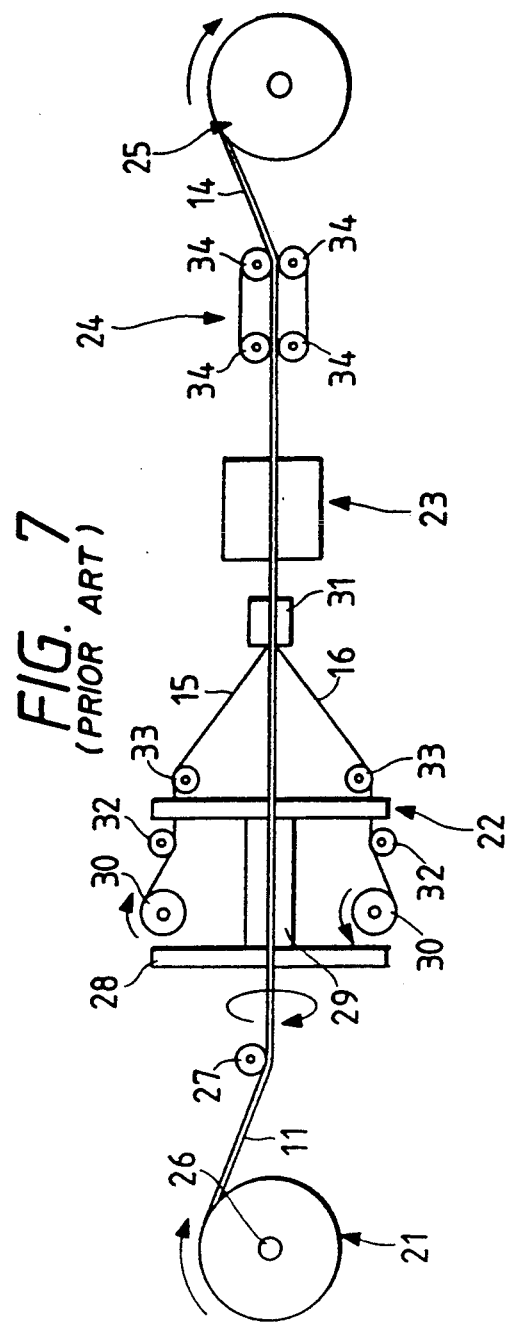
FIG. 7 (PRIOR ART) is a front schematic view of a conventional apparatus for manufacturing an optical fiber cable.

FIG. 4 shows an optical fiber cable manufacturing apparatus for carrying out the optical fiber cable manufacturing method according to another embodiment of the present invention. FIG. 5 shows the state in which the corresponding guide wheel is operated. The optical fiber cable manufacturing apparatus of the embodiment is of a drum twist type in which an optical fiber cable is manufactured with all devices except for the optical fiber supply reels being rotated in synchronism with the spiral grooves of the slotted rod, by hauling the slotted rod along its central axis.

That is, as shown in FIG. 4, the optical fiber cable manufacturing apparatus of another embodiment is constituted by a supply device 53 in which a supply drum 51, on which a slotted rod 11 is wound, is supported by a first rotary body 52 which can rotate in synchronization with spiral grooves 13 of slotted rod 11; an optical fiber insertion device 56 constituted by a plurality of supply reels 54 on which optical fibers 15 or optical fiber ribbons 16 are wound; a groove insertion device 55 for inserting the optical fibers 15 or the optical fiber ribbons 16 into the spiral grooves 13 in the slotted rod 11, respectively; a string winding device 57 for performing binding on the outer surface of the slotted rod 11 in which the optical fibers 15 or the optical fiber ribbons 16 are wound; a hauling device 58 for hauling an optical fiber cable 14; and a winding device 61 in which a winding drum 59 for winding the optical fiber cable 14 is supported by a second rotary body 60 which can rotate in synchronization with the spiral grooves 13 of slotted rod 11. A guide wheel 62, around which the optical fiber cable 14 can be wound at least twice, is provided between the string winding device 57 and the hauling device 58.

As shown in FIG. 5, the guide wheel 62, with its rotary shaft 63 supported by bearings 64, is made rotatable about an axis perpendicular to the hauling direction of the slotted rod 11. Further, the guide wheel 62 is rotatable about an axis of the hauling direction of the slotted rod 11 in synchronism with the spiral grooves 13 in the slotted rod 11.

Thus, as shown in FIG. 4, when the hauling device 58 is operated so as to haul the optical fiber cable 14, the supply drum 51 and the first rotary body 52 are rotated so as to feed the slotted rod 11 with predetermined tension. On the other hand, the supply reels 54 are rotated so as to feed the optical fibers 15 and the optical fiber ribbons 16 with lower predetermined tension than the slotted rod. The hauled optical fibers 15 and optical fiber ribbons 16 are inserted by the groove insertion device into the spiral grooves 13 of the slotted rod 11 while maintaining their positions relative to the spiral grooves 13 in the slotted rod 11. The optical fibers 15 or fiber ribbons 16 are then binding by the string winding device 62.

The optical fiber cable 14 is subsequently wound at least twice around, and rotated upon, the guide wheel 62, and then wound up on the winding drum 59 through the hauling device 58. The optical fiber cable 14 is wound on the guide wheel 62 at least twice to maintain the relative length between the slotted rod 11 and the optical fibers 15 or the optical fiber ribbons 16 over the entire length of the cable while also maintaining the predetermined tension.

According to the above-described embodiments of the optical fiber cable manufacturing apparatus and method according to the present invention, the optical fiber cable having the optical fibers inserted in the spiral grooves of the slotted rod, and having the binding or wrapping applied therein, is wound on the guide wheel rotatable about an axis perpendicular to the hauling direction of the slotted rod and then hauled, so that the relative length between the slotted rod and the optical fibers can be evenly distributed over the entire length of the cable, or within a required range, while the optical fiber cable maintains a predetermined tension. As a result, stable transmission characteristics of the optical fiber cable are maintained.

What is claimed is:

1. A method of manufacturing an optical fiber cable stranding comprising the steps of:
    drawing, under a predetermined tension, a slotted rod having grooves formed longitudinally on an outer circumferential surface thereon by a drawing device;
    inserting optical fibers into said grooves;
    applying a pressing winding onto said outer circumferential surface of said drawn slotted rod, thereby forming said optical fiber cable arrangement;
    winding said optical fiber cable arrangement around a guide wheel in order to maintain said predetermined tension, said guide wheel being passively rotatable about an axis perpendicular to said slotted rod;
    receiving said optical fiber arrangement into said drawing device from said guide wheel; and
    winding said optical fiber cable arrangement received from said drawing device onto a winding drum, wherein said drawing device is disposed between said guide wheel and said winding drum.

2. The method of claim 1, wherein said optical fiber cable stranding is wound at least twice around said guide wheel to maintain a relative length between said slotted rod and said optical fibers.

3. An apparatus for maintaining stable transmission characteristics during manufacture of an optical fiber cable stranding, said apparatus comprising:
    a first drum for feeding a slotted rod having spiral grooves formed longitudinally on an outer circumferential surface thereon;
    a hauling device for hauling said slotted rod at a predetermined tension;
    an insertion means for inserting optical fibers into said grooves;
    a binding means for applying a binding onto said outer circumferential surface of said slotted rod to form said optical fiber cable;
    a guide wheel, around which said slotted rod is wound, for receiving said optical fiber cable from said binding means and maintaining said predetermined tension,
    said hauling device receiving said optical fiber cable stranding from said guide wheel; and
    a second drum for receiving said optical fiber cable stranding from said hauling device.

4. An apparatus, as claimed in claim 3, wherein said guide wheel is passively about an axis perpendicular to a central axis of said slotted rod.

5. An apparatus, as claimed in claim 3, wherein said guide wheel is a rotatable drum.

* * * * *